Jan. 23, 1962   H. M. MONAGHAN   3,017,784
PHASED SYNCHRONOUS DRIVE FOR RECORDERS AND THE LIKE
Filed April 1, 1960
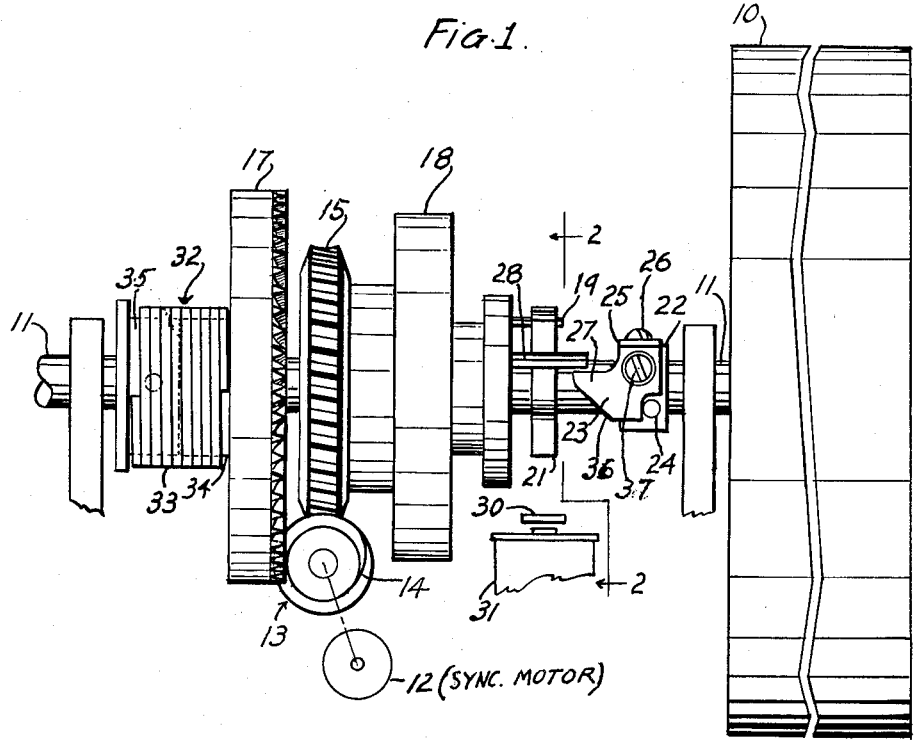
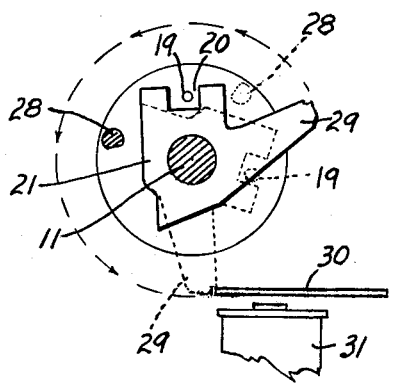
HUGH M. MONAGHAN
INVENTOR.
BY John J. Rogan
ATTORNEY United States Patent Office 3,017,784
Patented Jan. 23, 1962

3,017,784
PHASED SYNCHRONOUS DRIVE FOR
RECORDERS AND THE LIKE
Hugh M. Monaghan, Bronx, N.Y., assignor, by mesne assignments, to Litton Systems, Inc., Beverly Hills, Calif., a corporation of Maryland
Filed Apr. 1, 1960, Ser. No. 19,282
6 Claims. (Cl. 74—395)

This invention relates to machines which are to be driven at a precise synchronous speed and which can be accurately rotationally phased.

A principal object of the invention is to provide a novel and simplified phasing and synchronous drive for a rotational element such for example as the drum of a facsimile or similar recorder.

While the invention will be described primarily in connection with a facsimile recorder, it will be understood that it is equally well applicable to the driving of any rotational element which is required to be operated at a precise synchronous speed and which can be rapidly brought into precise phase with another rotational control element. However, in the case of facsimile apparatus, the requirements for operating the scanning and recording elements or drums at a precise synchronous speed and in the proper phase relation, are more stringent than in other kinds of apparatus. Facsimile apparatus usually records in minute elemental areas and any change in speed or phase of the recording mechanism with respect to the transmitter will produce a highly objectionable wavy or other undesirable visual pattern in the recorded copy. Such minute variations would not be objectionable in other kinds of mechanisms.

While various forms of phasing drives for facsimile machines have been proposed heretofore, the most common form effects the phasing by stopping the recording mechanism and then releasing it for motion at the proper instant in response to a phasing pulse or signal. If, as is usually the case, the recording mechanism has considerable mechanical inertia or is operated at very high speed, it is difficult to release and accelerate the recording mechanism quickly enough so as to insure the desired precise phase relation. Usually such prior arrangements employed a clutch mechanism, and, in order to reduce the size of the clutch that is required and to avoid extremely difficult clutch adjustments, it has been proposed heretofore to maintain the recording mechanism in motion at somewhat less than synchronous speed prior to the phasing operation. The present invention is concerned with improvements in the last mentioned form of phasing control.

Accordingly a feature of the invention relates to a novel plural-gear and clutch phasing latch arrangement for driving a facsimile drum slightly below synchronous speed prior to phasing, and then, in response to a phasing signal or pulse, to release the latch, whereby the drum is easily brought up to synchronous speed and very rapidly assumes the proper phase relation with respect to an associated transmitter signal.

A further feature relates to the novel organization, arrangement and relative location and interconnection of parts which cooperate to provide an improved phasing control for recording drums and the like.

Other features and advantages not specifically enumerated will be apparent after a consideration of the following detailed descriptions and the appended claims.

In the drawing:

FIG. 1 is a plan view of a facsimile drum and associated synchronous drive and phasing arrangement according to the invention;

FIG. 2 is a sectional view of part of FIG. 1 taken along the line 2—2 thereof.

Referring to the drawing, the numeral 10 represents the scanning drum or other equivalent rotary element of the mechanism to be synchronously driven and phased. In the case of facsimile machines, element 10 may be the usual cylindrical drum around which is fastened a recording blank upon which intelligence is to be recorded or reproduced by well known facsimile or telegraph techniques. Drum 10 is mounted on shaft 11 for rotation therewith and is arranged to be driven by any well known form of synchronous motor 12 which drives the single or double thread worm 13. The thread 14 of worm 13 meshes with a peripherally toothed worm wheel 15, and also meshes with the face teeth of another worm wheel 17. Worm wheel 17 is rotatable on shaft 11 and is coupled to that shaft for driving relation through a unidirectional coupling or overrun clutch 32 here shown as of the helical spring friction type. Wheels 15 and 17 are concentric with respect to shaft 11. However, the gear ratio between 14 and 15 is such that wheel 15 is driven for example at 60 r.p.m., while the gear ratio between 14 and 17 drives wheel 17 for example at 50 r.p.m.

Fastened to gear 15 is the driving element of a suitable clutch 18, which may be of the ratchet type, whose driven element is coupled to shaft 11. To effect such coupling there is fastened to the driven element of clutch 18 an arm 19 which registers with a notch 20 in a phasing control member 21. Member 21 is rotatably mounted on shaft 11 so that its rotation can be stopped without stoppage of the shaft 11. The clearance between pin 19 and the edges of slot 20 provides relative motion to disengage the ratchet clutch. Pivotally mounted on a block 22, fastened to shaft 11, is a latch 23 which is normally held against stop 24 by means of a flat leaf spring 25 fastened by screw 26 to block 22. The latch 23 has a flat edge 27 which is adapted to be engaged by an arm 28 fastened to the driven member of clutch 18 so that when arm 28 catches up with latch 23 it causes the latch to abut against stop 24 and positively drives the shaft 11 at synchronous speed through gear 15.

Phasing member 21 has a leg 29 adapted to engage the armature 30 of a phasing control electromagnet 31. When the magnet 31 is deenergized, as shown in FIG. 2, the armature 30 is interposed in the path of leg 29, as indicated in the dotted line position of FIG. 2, thus stopping the driven member of clutch 18 and also stopping the arm 28. However, even though so stopped, the shaft 11 continues to rotate at less than synchronous speed by reason of its being driven through gear 17, which is coupled to shaft 11 by a uni-directional coupling or clutch 32. This latter coupling may take any well known form of overrunning shock or one-way clutch. For example, it may comprise a coiled spring 33 normally wound up in such a direction as to grip the hub 34 of gear 17 and the adjacent collar 35 which is attached to shaft 11, so as to turn the shaft 11 when arm 28 is stopped to enable shaft 11 to be driven by gear 17 even while arm 28 is stopped. Thus, even though the phasing member 21 is stopped, the shaft 11 can continue to rotate since the inclined edge 36 of latch 23 can freely ride over the end of arm 28 by reason of its pivoted attachment at 37 to block 22. Thus, with magnet 31 deenergized, shaft 11 is driven at below synchronous speed through the elements 17 and 32. Upon the receipt of a phasing signal, which can be transmitted in any well known manner from an associated facsimile transmitter, the magnet 31 is energized, thus releasing the phasing member 21 and allowing it to be driven through gear 15, clutch 18 and the arm 28, this rotation being at synchronous speed since arm 28 is driven through gear 15 and clutch 18. After a very short interval, arm 28 catches up with latch 23 and will thereupon immediately drive the shaft 11 at synchronous speed. Since the shaft 11 is rotating at almost synchronous speed, the mechanism is brought up to synchronous speed without any danger of stalling the synchronous motor.

Various changes and modifications may be made in the disclosed embodiment without departing from the spirit and scope of the invention.

What is claimed is:

1. A synchronous drive and phasing arrangment for facsimile recorders and the like, comprising, a shaft to be driven at synchronous speed when properly phased, a pair of gears concentric with said shaft and rotatably mounted thereon, the first gear being arranged to drive the shaft at synchronous speed and the second gear being arranged to maintain said shaft at slightly different speed until said phasing is accomplished, a clutch for coupling the first gear to said shaft, another uni-directional drive coupling between the second gear and said shaft, a phasing member arranged to be stopped and released for rotation by a phasing signal and effective in one position to stop the driven element of said clutch while permitting the said shaft to be driven through the said drive coupling at said different speed, means coupling said phasing member to said shaft, and a common driving gear arranged to be driven at a rate correlated with said synchrouous speed and in mesh with both said first gear and said second gear.

2. A synchronous drive and phasing arrangement according to claim 1 in which said common gear is a worm and the first of said pair of gears is a peripherally-toothed worm wheel and the second gear is a face-toothed worm wheel.

3. A synchronous drive and phasing arrangement according to claim 1 in which the said second gear has a different number of teeth for driving said shaft at a lower rate than the first gear.

4. A synchronous drive and phasing arrangement according to claim 3 in which said uni-directional drive coupling includes a coiled spring concentric around said shaft having one end coupled to said second gear and the other end coupled to said shaft.

5. A synchronous drive and phase mechanism for facsimile recorders and the like, comprising a shaft to be driven at synchronous speed when properly phased, a first gear, a second gear, both said gears being concentric with and rotatable on said shaft, a clutch having a driving member connected to the first gear, a phasing member rotatably supported on said shaft and coupled to the driven element of said clutch, a phasing electromagnet having a shiftable stop for engaging an abutment on said phasing member to control rotation of said phasing member in response to a phasing signal, a latch member pivotally fastened to said shaft and disposed in the path of said phasing member to permit said shaft to continue to rotate even when said driven element of said clutch is stopped by engagement of said shiftable stop with said abutment, a coiled spring clutch concentric around said shaft for coupling said second gear to said shaft, and a worm gear in mesh with both the first and second gears for driving the first gear at synchronous speed and for driving the second gear at a speed different from said synchronous speed.

6. A synchronous drive and phasing mechanism according to claim 5 in which said phasing member is coupled to the driven element of said clutch through a pin slot arrangement.

References Cited in the file of this patent

UNITED STATES PATENTS

| | | |
|---|---|---|
| 2,281,569 | Fritsche | May 5, 1942 |
| 2,573,011 | Gruber | Oct. 30, 1951 |
| 2,772,576 | Ross | Dec. 4, 1956 |
| 2,796,317 | Valenti et al. | June 18, 1957 |

OTHER REFERENCES

Product Engineering, Design Digest Issue, Mid-September 1958, page E19.